United States Patent [19]
Hillinger

[11] Patent Number: 5,060,894
[45] Date of Patent: Oct. 29, 1991

[54] STAND WITH COLLAPSIBLE LEGS

[75] Inventor: George Hillinger, Los Angeles, Calif.

[73] Assignee: Alltrade, Inc., Commerce, Calif.

[21] Appl. No.: 688,291

[22] Filed: Apr. 22, 1991

[51] Int. Cl.$^5$ .............................................. F16M 11/38
[52] U.S. Cl. .................................... 248/170; 211/203; 403/166
[58] Field of Search ............... 248/434, 435, 168, 169, 248/170, 171, 291, 188.6; 362/410, 413; 211/203; 403/166, 157, 92, 93, 107

[56] References Cited

U.S. PATENT DOCUMENTS

| | | | |
|---|---|---|---|
| 1,863,756 | 6/1932 | Lufkin | 248/170 |
| 3,523,670 | 8/1970 | Pfister | 248/168 |
| 4,317,552 | 3/1982 | Weidler | 211/203 X |
| 4,453,686 | 6/1984 | Ina | 248/188.6 |
| 4,905,946 | 3/1990 | Lai | 403/92 X |
| 4,929,113 | 5/1990 | Sheu | 403/166 X |

Primary Examiner—J. Franklin Foss
Attorney, Agent, or Firm—Edgar W. Averill, Jr.

[57] ABSTRACT

A stand with collapsible legs. The legs are held to the stand by a disk member held within a pair of ears. One of the ears has a toothed opening, and the disk member includes a toothed opening. A gear member may be moved to a locked position where the gear contacts both the toothed portion of the disk member and the toothed portion of one of the ears which locks the disk in a fixed position. When the gear member is moved out of contact with the disk member, the disk member can then move freely with respect to the pair of ears. This permits the legs to be placed in numerous locked positions. Preferably, an outwardly extending tab allows the legs to be moved into a preferred position for locking.

11 Claims, 3 Drawing Sheets

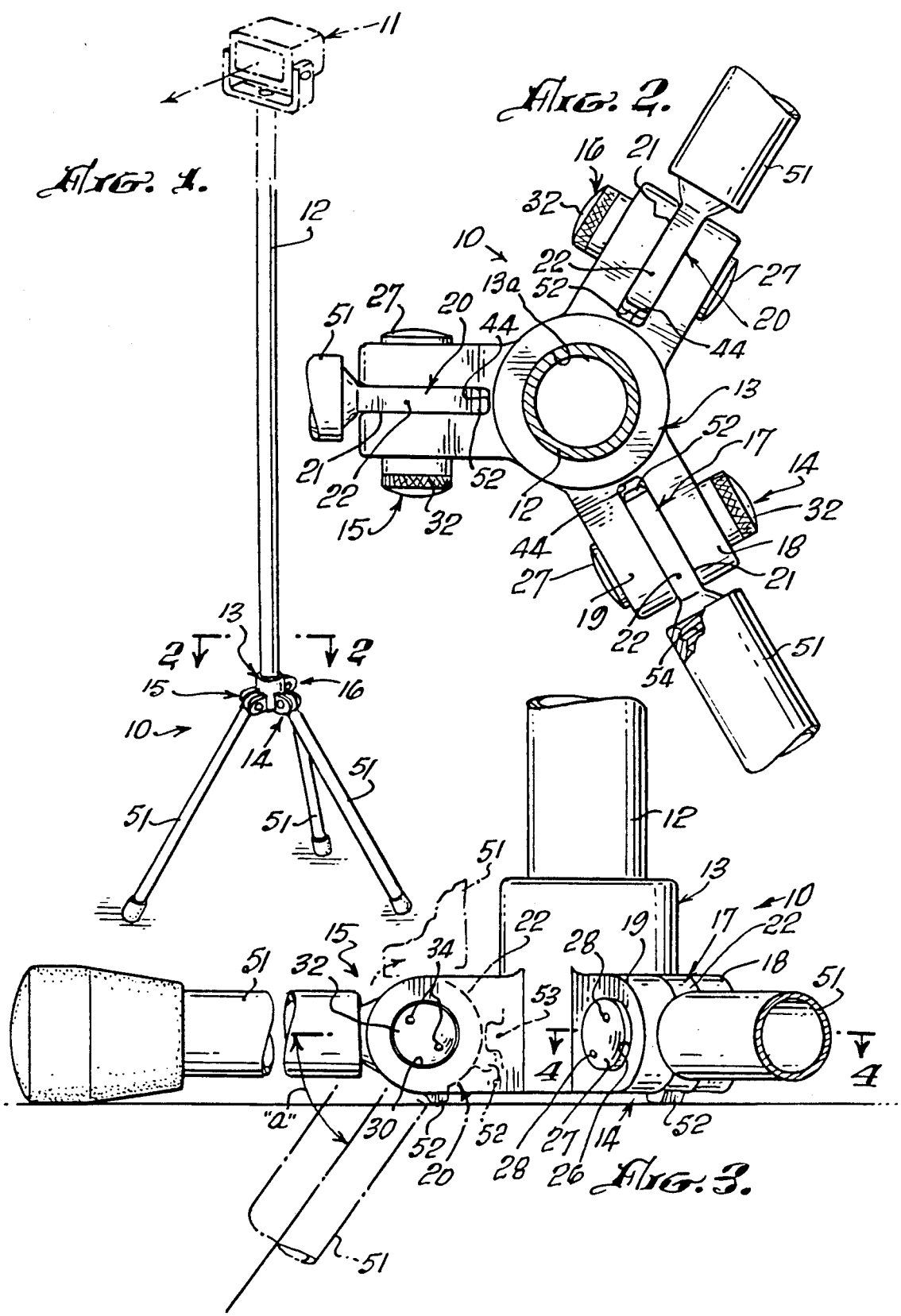

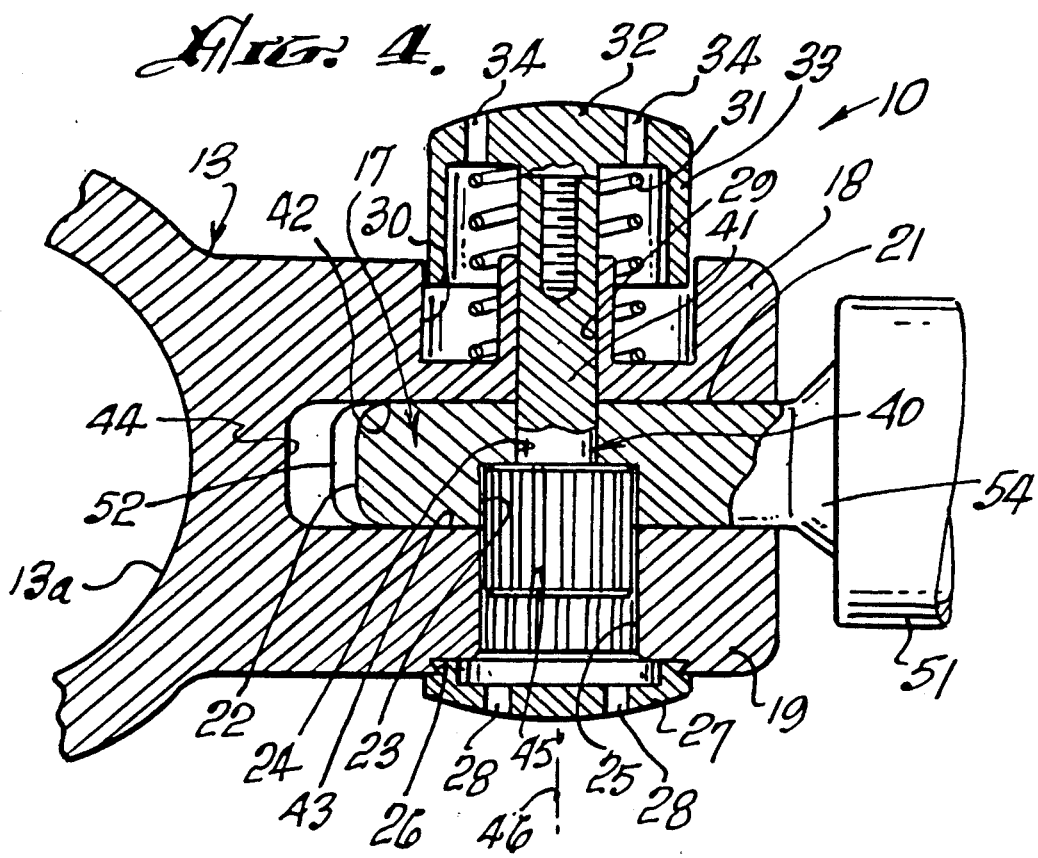
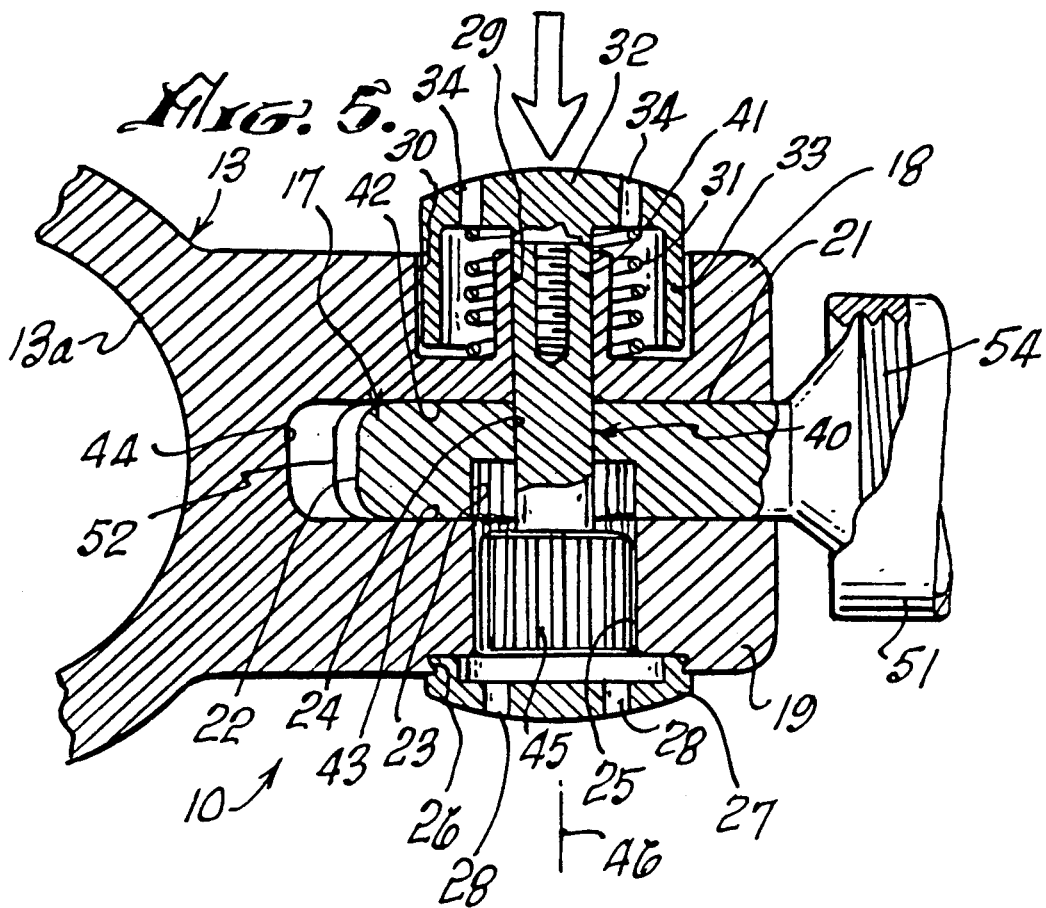

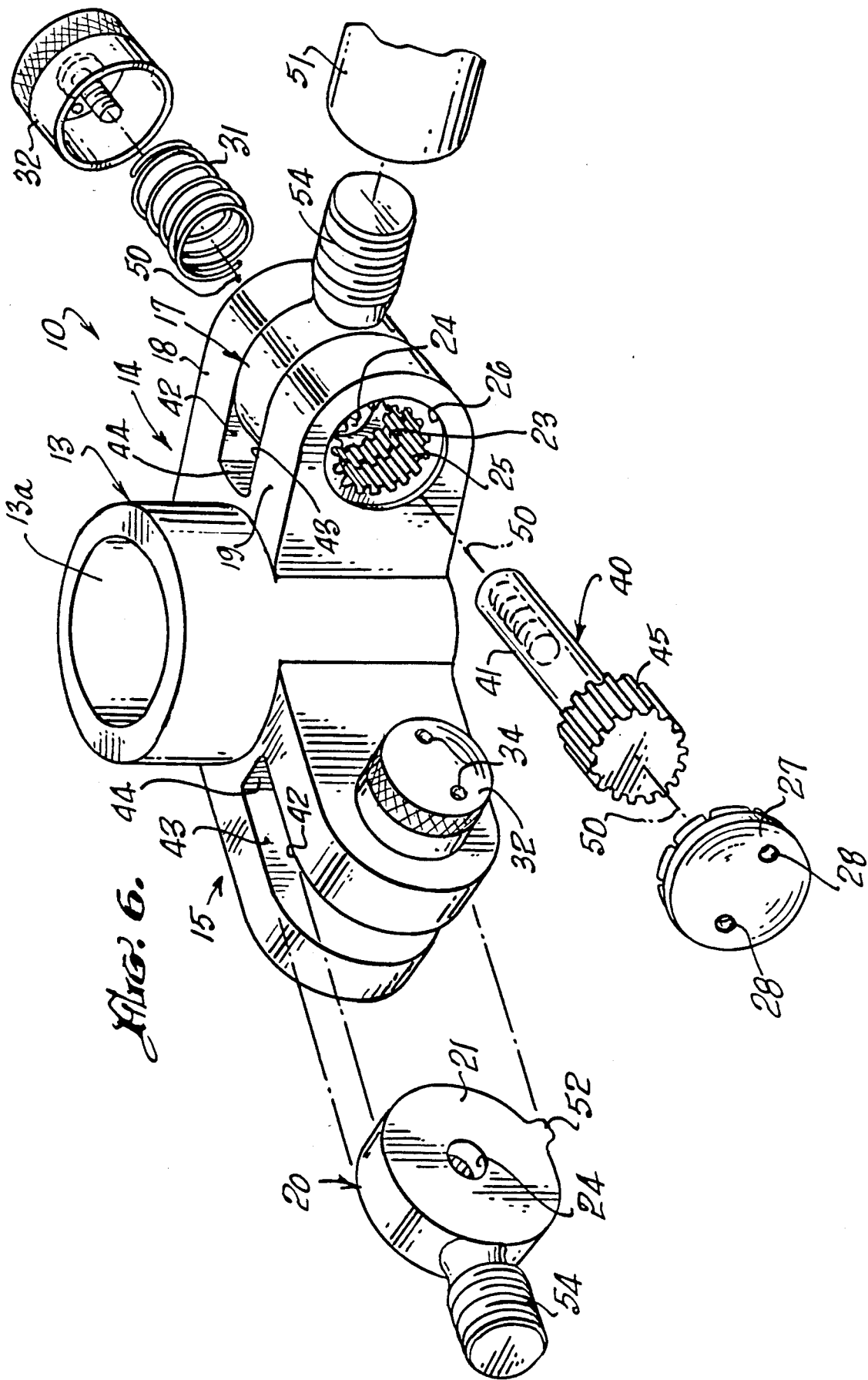

STAND WITH COLLAPSIBLE LEGS

BACKGROUND OF THE INVENTION

The field of the invention is collapsible stands. Such stands are typically tripods and are commonly used to support numerous objects.

One such assembly is shown in the Wang U.S. Pat. No. 4,905,946. Other methods for locking an element such as a leg in various fixed positions are shown in the following U.S. Pat. Nos.: 261,894; 496,834; 742,590; 772,293; 2,271,332; 2,353,513; 2,463,082; 2,556,995; 2,588,399; 3,419,295; 3,520,514; 3,804,355; 3,961,176; 4,150,733; 4,593,879 and 4,770,559.

For uses such as supporting a light fixture such as a halogen lamp, it is important that the legs be securely locked in a fixed position. Such stands are designed for long-term use, and the locking method should be one which would withstand many years of wear, be highly reliable, be easy to operate and which permits more than one possible position for support on an uneven surface such as a flight of stairs.

SUMMARY OF THE INVENTION

It is an object of the present invention to provide an apparatus which will hold a leg in various secure positions and yet which is both reliable and easy and intuitive to use.

The present invention is for a connection assembly for holding one or more legs to a stand in an adjustable manner. The assembly includes a pair of ears which have a disk member support slot between them. One of the ears is a pushbutton support ear which has a pin-supporting opening passing through it. The other ear is a gear-support ear which has a toothed opening. A disk member is held between the ears by a gear-type lock pin. The disk member has a toothed opening extending part way through it, and the gear portion of the gear-type lock pin fits into the toothed opening. The gear-type lock pin includes means for attachment of a pushbutton which moves the gear portion of the lock pin into a locked position where it mates both with the toothed opening of the disk member and the toothed opening of the gear-support ear. The pushing of the pushbutton also moves the gear portion so that it is entirely held within the gear-support ear so that the disk member can rotate with respect to the pair of ears. Preferably, a tab extends outwardly from the disk member so that when the button is pushed, the leg can move downwardly to a preferred position such as a 45° angle at which point the button can be released locking the leg in the preferred position. Preferably, the gear has sufficient teeth so that the leg can be locked in numerous positions.

BRIEF DESCRIPTION OF THE DRAWINGS

FIG. 1 is a perspective view of a lamp stand including the connection assembly of the present invention.

FIG. 2 is an enlarged cross-sectional view taken along line 2—2 of FIG. 1.

FIG. 3 is an enlarged side view, partly in cross-section showing the leg attachment portion of the stand of FIG. 1.

FIG. 4 is an enlarged cross-sectional view taken along line 4—4 of FIG. 3 showing the leg in a locked position.

FIG. 5 is a cross-sectional view analogous to FIG. 4 but showing the leg in an unlocked position.

FIG. 6 is an exploded, perspective view showing the connector portion of the stand of FIG. 1.

DESCRIPTION OF THE PREFERRED EMBODIMENTS

The stand, which includes the collapsible leg assembly of the present invention, is shown in FIG. 1 and indicated by reference character 10. Stand 10 has a halogen lamp 11 shown in phantom view in FIG. 1 supported on a vertical shaft 12. Vertical shaft 12 is held in a connector body 13 which has a blind opening 13a into which shaft 12 is inserted.

Connector body 13 has three adjustable connection assemblies 14, 15 and 16. These three assemblies are identical and, thus, only assembly 14 will be described with the understanding that 15 and 16 are identical to 14.

Turning to FIG. 6, the elements of the connection assembly 14 are shown in exploded, perspective view. A disk member 17 is held between a pair of ears 18 and 19. An identical disk member 20 is also shown in FIG. 6 which shows one of the flat disk surfaces 21 and an outer disk surface 22. Disk member 17 has an identical flat disk surface 21 and outer disk surface 22. A toothed opening 23 extends about half way through disk member 17. Disk member 17 is shown in cross-sectional view in FIGS. 4 and 5 which also show this toothed opening 23. A cylindrical opening 24 extends through the remainder of disk 17 as also shown in FIGS. 4 and 5. Ear 19 is a gear-support ear and includes a toothed opening 25 which extends essentially through the entire ear 19. A small recess 26 permits the attachment of a dust cover 27. Dust cover 27 is shown affixed in place in FIGS. 4 and 5. Dust cover 27 has a pair of openings 28 which can be used for lubrication.

Ear 18 is a pushbutton support ear and is shown in cross-sectional view in FIGS. 4 and 5. Ear 18 has a pin-supporting cylindrical opening 29 extending completely therethrough, and a recess 30 holds a spring 31 and also permits the entry of pushbutton member 32. Pushbutton member 32 has a skirt 33 and a pair of openings 34 which also assist in adding a lubricant.

Pushbutton member 32 is threadably affixed to a gear-type lock pin shown best in FIG. 6 and indicated by reference character 40. Gear-type lock pin 40 has a pin portion 41 which fits within pin-supporting cylindrical opening 29 in ear 18 and also fits within cylindrical opening 24 in disk member 17 as best shown in FIGS. 4 and 5. Thus, pin portion 41 supports disk 17 as it is rotated with respect to gears 18 and 19. Of course, disk 17 is also supported by the inner faces 42 and 43 which comprise the disk member support slot. The disk member support slot formed by inner faces 42 and 43 also has a base 44.

Gear-type lock pin 40 also has a gear portion 45 which securely fits within toothed opening 25 of ear 19 and toothed opening 23 in disk 17. As is evident in FIG. 6, the central axis 50, shown in FIG. 6, is aligned with the central axis of the following elements: the pin-supporting cylindrical opening 29; the toothed opening of the gear-support ear; the toothed opening 23 in disk member 17; the cylindrical opening 24 of disk 17; and the gear-type lock pin 40.

The operation of the unit is shown best by comparing FIGS. 4 and 5. The gear portion 45 of gear-type lock pin 40 meshes both with the toothed opening 23 of disk 17 and the toothed opening 25 of ear 19 so that disk 17 and the leg 51 affixed thereto are locked in place. Leg 51 is threadably held to a threaded extension 54 which is integral with disk 17. It can also be seen that when pushbutton member 32 is depressed, as shown in FIG. 5, that the gear portion 45 moves out of the toothed opening 23 in disk member 17 so that the leg is free to move into an upward direction where it is in a folded condition or downwardly to a preferred 45° position as shown in phantom view in FIG. 3 where the angle is indicated by reference character "a." After the leg has been moved to a desired position, pushbutton member 32 is released, and gear portion 45 moves back to the position shown in FIG. 4 thus locking the leg in its new position.

In a preferred configuration, an outwardly extending tab 52 abuts a tab 53 which is affixed to the base 44 of the slot formed between ears 18 and 19.

Preferably, the stand has three legs 51, as shown in FIG. 1, and also the gear portion 45 has sufficient teeth so that the legs can be locked in numerous different positions. It has been found that at least sixteen teeth are appropriate with twenty teeth being preferred. This permits the leg to be adjusted in 18° increments.

It is, of course, possible to have leg 51 attached to the ears 18 and 19 and the disk member 17 supported by the connector body 13. In that way, the pushbutton member 32 would turn as the leg 51 is lowered or raised. The preferred construction is shown in the drawings, but it is important that the reverse configuration could also function very well.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A stand with collapsible legs, said stand including two basic elements, namely, a stand element and a leg element, which elements are connected in an adjustable manner to one another by a connection assembly, said connection assembly comprising:
a pair of ears held by one of said elements, said pair of ears being separated by a disk member support slot having an open end and a closed end, said pair of ears comprising:
a pushbutton support ear having a pin-supporting cylindrical opening passing therethrough, said pin-supporting cylindrical opening having a central axis; and
a gear-support ear having a toothed opening having a central axis aligned with the central axis of said pin-supporting cylindrical opening of said pushbutton support ear;
a disk member affixed by the other of said elements, said disk member being held in said disk member support slot by said pair of ears, said disk member having a toothed opening including a central axis, said toothed opening has the same cross-sectional shape as the toothed opening of said gear-support ear and the central axis of the toothed opening of the disk member being aligned with the central axis of the toothed opening of the gear-support ear, said disk member also having a cylindrical opening axially aligned with the central axis of the toothed opening of the disk member and having the same inside diameter as the pin-supporting cylindrical opening of the pushbutton support ear and said disk member having an outer disk surface;
a gear-type lock pin having a gear portion which closely mates with the toothed openings of the gear-support ear and the disk member and a pin portion which fits closely into the pin-supporting cylindrical opening of the pushbutton support ear and the cylindrical opening of the disk member, said gear-type lock pin being movable into a locked position wherein the gear portion thereof is held both by the toothed opening of the disk member and the toothed opening of the gear-support ear and into an unlocked position when the gear portion is completely within the toothed portion of the gear-support ear; and
a pushbutton member attached to the pin end of the gear-type lock pin whereby the disk member is locked in a fixed position with respect to the pair of ears when the gear-type lock pin is in its locked position, but is at least partially rotatable when said gear-type lock pin is in an unlocked position.

2. The stand with collapsible legs of claim 1 wherein said disk member further includes an outwardly extending tab on its outer disk surface, said tab extending outwardly to abut the closed end of the disk member support slot to limit the rotation of the disk member.

3. The stand with collapsible legs of claim 1 further including biasing means between said pushbutton member and said pushbutton support ear urging said pushbutton member outwardly with respect to said ear.

4. The stand with collapsible legs of claim 3 wherein said pushbutton support ear has a pushbutton recess, and said pushbutton includes a skirt which extends into said pushbutton recess.

5. The stand with collapsible legs of claim 1 wherein said pair of ears is affixed to said stand body.

6. The stand with collapsible legs of claim 5 wherein said disk member further includes a threaded recess and has a leg threadably affixed thereto.

7. The stand with collapsible legs of claim 1 wherein said toothed opening of said disk member extends through about one-half of the thickness of said disk member.

8. The stand with collapsible legs of claim 1 further including a dust cover affixed over the toothed opening of said gear-support ear.

9. A stand with collapsible legs, said stand comprising:
a stand body to which an object to be supported is affixable, said stand having a central axis;
a pair of ears held by said stand body, said pair of ears being separated by a disk member support slot having an open end and a closed end, said pair of ears comprising:
a pushbutton support ear having a pin-supporting cylindrical opening passing therethrough, said pin-supporting cylindrical opening having a central axis; and
a gear-support ear having a toothed opening having a central axis aligned with the central axis of said pin-supporting cylindrical opening of said push button support ear;
a disk member held in said disk member support slot by said pair of ears, said disk member having a toothed opening including a central axis, said toothed opening has the same cross-sectional shape as the toothed opening of said gear-support ear and the central axis of the toothed opening of the disk member being aligned with the central axis of the toothed opening of the gear-support ear, said disk member also having a cylindrical opening axially aligned with the central axis of the toothed opening of the disk member and having the same inside diameter as the pin-supporting cylindrical opening of the pushbutton support ear and said disk member having an outer disk surface, said disk member including means for attachment of a leg thereto and having a leg attached thereto;

a gear-type lock pin having a gear portion which closely mates with the toothed openings of the gear-support ear and the disk member and a pin portion which fits closely into the pin-supporting cylindrical opening of the pushbutton support ear and the cylindrical opening of the disk member, said gear-type lock pin being movable into a locked position wherein the gear portion thereof is held both by the toothed opening of the disk member and the toothed opening of the gear-support ear and into an unlocked position when the gear portion is completely within the toothed portion of the gear-support ear; and a pushbutton member attached to the pin end of the gear-type lock pin whereby the disk member is locked in a fixed position with respect to the pair of ears when the gear-type lock pin is in its locked position, but is at least partially rotatable when said gear-type lock pin is in an unlocked position.

10. The stand with collapsible legs of claim 9 wherein said toothed openings of said gear-support ear and said disk member and the gear portion have at least about sixteen teeth.

11. The stand with collapsible legs of claim 9 wherein said disk member has an outwardly extending tab which abuts said closed end of said disk member support slot when said leg affixed to said disk member is at about a 45° angle with respect to the axis of said stand body.

* * * * *